June 9, 1931. C. W. CARTER 1,809,580
APPARATUS FOR BROILING BACON AND THE LIKE
Filed Sept. 27, 1928 2 Sheets-Sheet 1
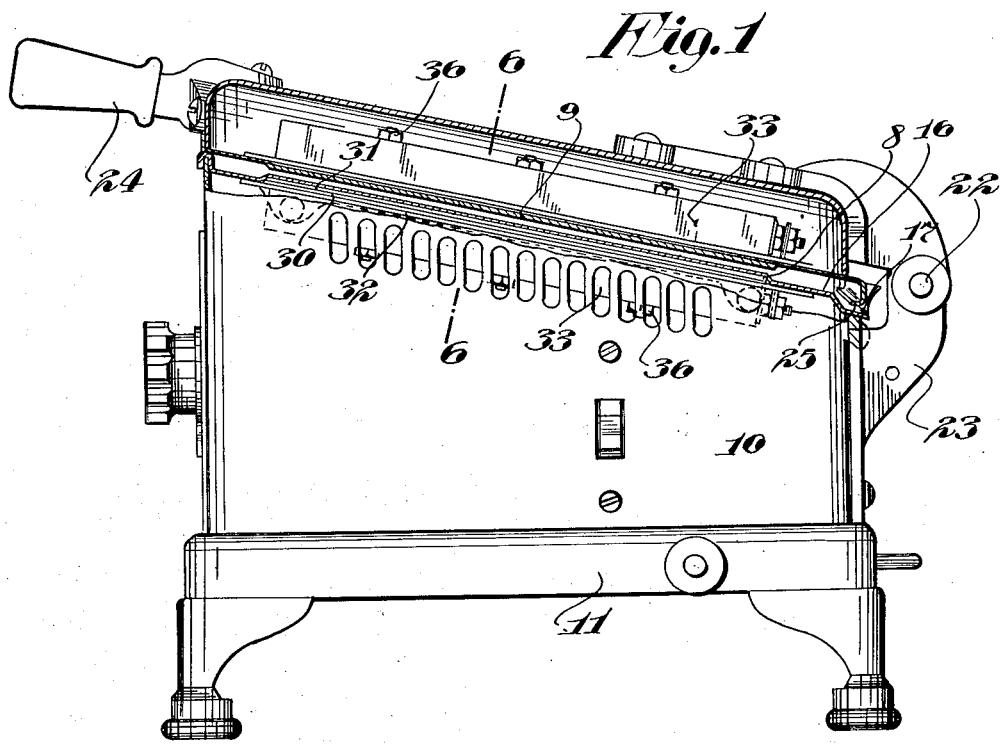
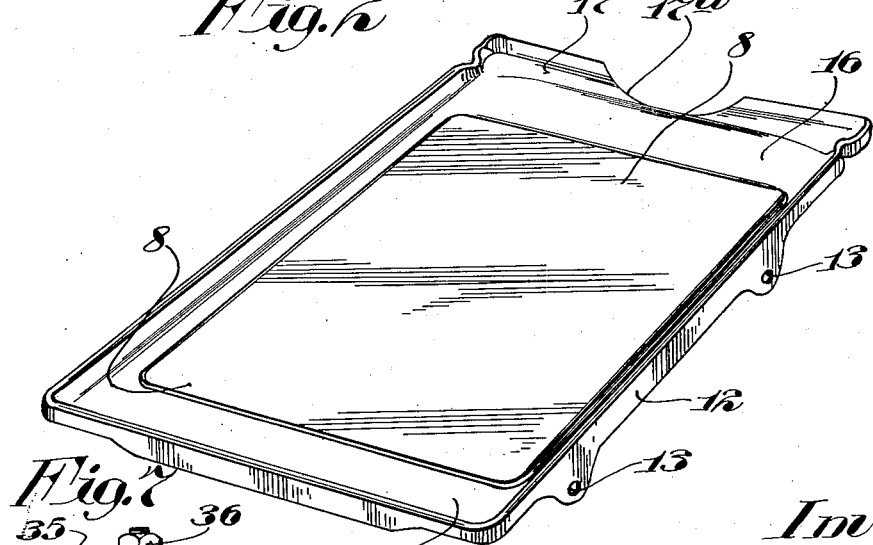
Inventor
Clarence W. Carter
By his Attorneys

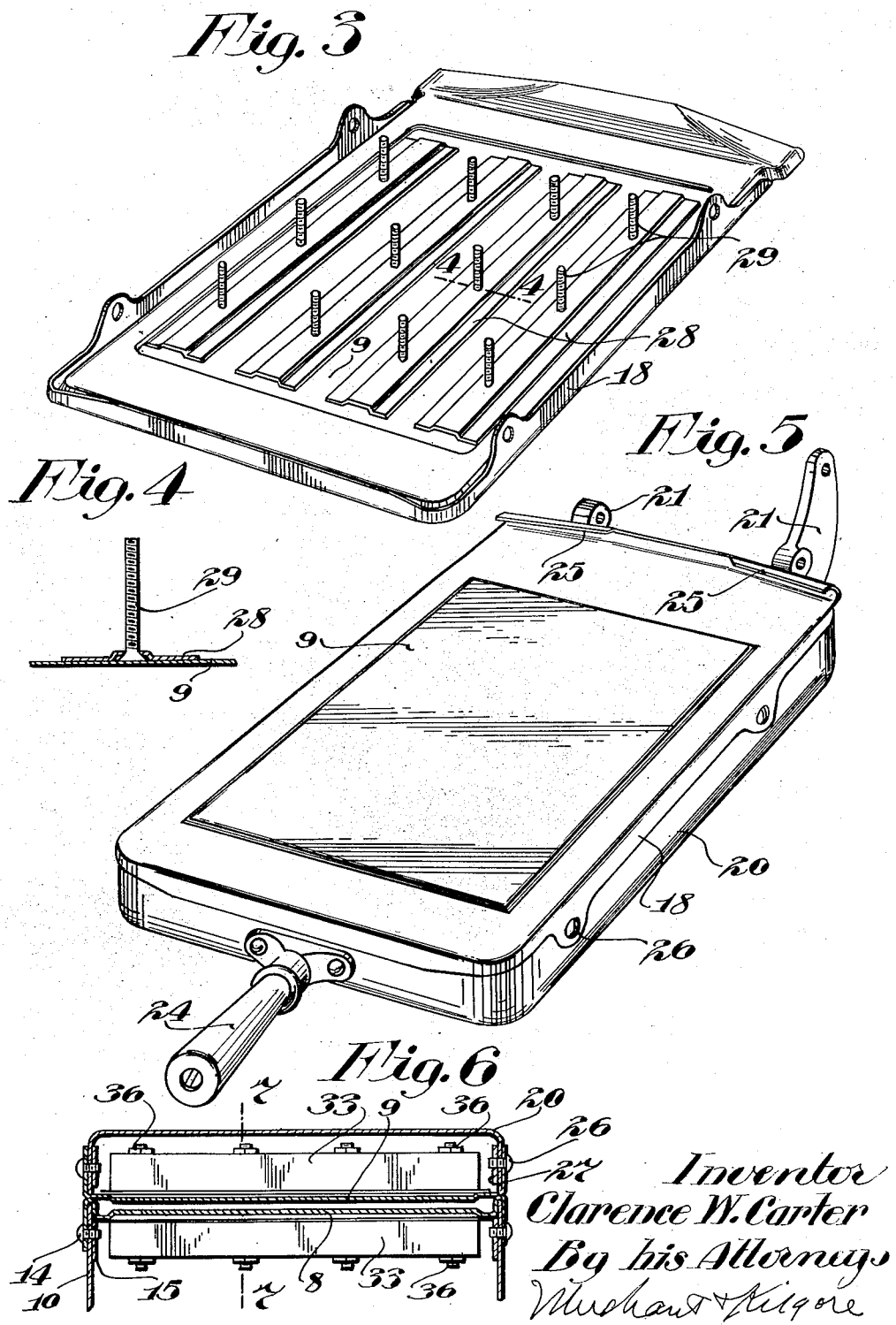

Patented June 9, 1931

1,809,580

UNITED STATES PATENT OFFICE

CLARENCE W. CARTER, OF MINNEAPOLIS, MINNESOTA

APPARATUS FOR BROILING BACON AND THE LIKE

Application filed September 27, 1928. Serial No. 308,706.

My present invention relates to apparatus for broiling meat and is especially designed as an improvement on and refinement of the apparatus disclosed and broadly claimed in the prior United States Patent No. 1,656,662, granted of date January 17, 1928, to myself, Clarence W. Carter, and Charles P. Strite, as joint inventors. The general objects and utility of an apparatus of this character are fully disclosed and broadly claimed in the said prior patent and may be here passed with a brief statement that such apparatus is especially designed for broiling or frying bacon and the like under an action that prevents curling of the bacon or the like while permitting the grease to run therefrom during the broiling operation.

After much experimentation which has resulted in a commercial form of broiling apparatus of the most satisfactory form, both from the point of manufacture and high efficiency in use, I have discovered the following facts, to wit:

(a) That in electrical broiling apparatus of this character, thin cooking or broiling plates which may be very quickly heated are very desirable and essential to the best results.

(b) That salt-resisting alloy such as chrome nickel or Monel, which will resist rust and corrosion from salt exuded from bacon and the like in the broiling or cooking action, should be used for the broiling or cooking plates.

(c) That such salt-resisting metal is hard to cast and that it is practically impossible to cast such metal, or any other metal, for that matter, in very thin plates, from which it follows that said broiling or cooking plates in practice should be of pressed metal.

(d) That thin sheet metal broiling or cooking plates will tend to warp and that such warping of the plates should be prevented by the application of simple and efficient means for preventing such warping action.

(e) That the walls of the casing or parts that enclose the electrical heating elements should, for the sake of economy, be made of a cheaper metal than that employed for the boiling or cooking plates; and therefore that the broiling or cooking plates should be formed and subsequently or detachably applied to the co-operating walls.

The present invention meets all of the requirements above outlined or suggested, as will more fully appear from the following detail description of a commercial form of the apparatus illustrated in the accompanying drawings, wherein like characters indicate like parts throughout the several views.

Referring to the drawings:

Fig. 1 is a side elevation of the improved broiling apparatus, some parts being shown in vertical section;

Fig. 2 is a perspective view looking at the top of the lower broiling or cooking plate, showing the same detached from the casing proper;

Fig. 3 is a perspective showing the plate illustrated in detail in Fig. 2 turned upside down;

Fig. 4 is a detail in section on the line 4—4 of Fig. 3;

Fig. 5 is a perspective showing the hinged upper section of the broiler turned upside down so as to expose to full view the under face of the broiling or cooking plate;

Fig. 6 is a transverse section taken on the line 6—6 of Fig. 1; and

Fig. 7 is a fragmentary view, on an enlarged scale, in section on the line 7—7 of Fig. 6.

The lower cooking or broiling plate is indicated as an entirety by the numeral 8 and the upper broiling or cooking plate is indicated as an entirety by the numeral 9. The lower broiling plate 8 is detachably secured to the walls 10 of the lower or main shell or casing that is secured on a suitable base 11. The upper edges of the walls of this casing 10 are inclined longitudinally or from front to rear of the broiler and the plate 8, at its front and sides, has down-turned flanges 12 that fit closely over the upper edges of the walls 10. To securely attach the plate 8 to the walls 10, the side flanges thereof are shown as formed with screw holes 13 through which screws 14 (see Figs. 2 and 6) are adapted to be passed into screw-threaded engagement with nut-acting plates 15. Just inside of its flanges the plate 8 is depressed at 16 to form a grease-receiving channel that extends around the four sides of the raised operative face of the plate 8. At its lower edge portion, the grease channel leads to a transverse trough 17 that projects beyond the rear portion of the wall 10 and at its central portion is cut away at 17ª so that grease will be discharged into a suitable receptacle placed at the rear of the broiler.

The above described plate 8 is stamped from very thin sheet metal preferably a sheet of chrome nickel or Monel metal. In practice I have used sheet metal of No. 25 gauge, but, of course, do not limit myself to metal of such thickness, that dimension being given simply as a quick guide to a material that will be found commercially satisfactory.

The upper broiling or cooking plate 9, which is advisably made of the same sheet metal used in making the lower plate 8, at its front and sides, is formed with upwardly extended flanges 18 that overlap and are detachably secured to a shell-like pressed metal upper section 20 that has hinge lugs 21 pivotally connected by a hinge rod 22 to hinge lugs 23 on the back of the wall of the main casing 10. At its free front end, the upper shell 20 is shown as provided with an operating handle 24, by means of which it may be readily raised or lowered.

When the upper section or shell 20 is lowered on the lower section, as shown in Fig. 1, the co-operating faces of the two plates 8 and 9 will be substantially parallel and preferably spaced apart so as to hold strips of bacon against a curling action during the broiling operation, but without primarily pressing the face of the upper plate tightly against the bacon or thin meat strips. As best shown in Fig. 5, the operative face of the upper plate 9 is formed by a slightly depressed rectangular portion. At its lower edge, the plate 9 is turned downward and inward so as to form laterally spaced transversely extended catch spouts 25 arranged above and will deliver grease to the hopper-like catch trough 17 of the lower plate 8.

The upper plate 9, as well as the lower plate 8 may be attached or detachably secured to the respective shells in various different ways, but, as shown, said upper plate is detachably secured to the side flanges of the upper shell 20 by means of screws 26 passed through the side flanges of said plate 9 through perforations in the side flanges of the shell 20 and screwed into nut-acting plates 27.

The plates 8 and 9 are reinforced and stiffened preferably by thin sheet metal reinforcing strips 28 rigidly secured thereto preferably by spot welding. These strips are applied to the backs or unexposed faces of said plates. The said strips are formed with slightly bulged intermediate longitudinally extended portions that serve to hold the heads of anchoring screws 29 in position, as best shown in Figs. 3 and 4.

The heating elements and co-operating devices are anchored to the respective plates 8 and 9 by the screws 29. The heating elements which are here indicated by the numeral 30 are electrical heating elements which may take various forms, but may be assumed to be electric wires wound on thin mica cores. Thin sheets of insulating material 31 which may be mica or any other suitable insulation are placed between the electrical heating elements 30 and the backs of the respective plates 8 and 9. Also in the preferred arrangement, a thin sheet of insulating material 32 is placed directly against the outer face of each heating element, and next to the insulations 32, flanged metal stiffening plates 33 are placed. Next to the plates 33 are heavy layers of insulating material 34 and against these insulating bodies 34, reinforcing metal plates 35 are placed.

The anchoring screws or studs 29 are passed through the above noted elements 30, 31, 32, 33, 34 and 35, and nuts 36 on said studs are tightly screwed against the plates 35. When the said parts are assembled as above described, the plates 33 and 35 will vary materially, stiffen and reinforce the thin sheet metal broiling or cooking plates 8 and 9 and effectually hold the same against warping. The arrangement of the insulations conserves the heat against outward radiation except from the operative faces of the plates 8 and 9.

In connection with the drawings I have described a late commercial form of the improved device, but, of course, it will be understood that the structure is capable of modification within the scope of the appended claims.

What I claim is:

1. In a device of the character described, relatively movable shells, co-operating thin sheet metal broiling plates detachably applied to the respective shells, metallic stiffening strips applied to the backs of the respective broiling plates, and heating elements secured to the backs of the respective broiling plates and contained within the respective shells.

2. In a device of the character described, relatively movable shells, co-operating thin sheet metal broiling plates applied to the respective shells, and metallic reinforcing strips secured to the backs of the respective broiling plates, screws projecting through said stiffening strips and having heads held by said strips, and heating elements secured to the backs of the respective broiling plates, by the said screws.

3. The structure defined in claim 2 in which said stiffening strips have bulged central portions to afford clearance for the heads of said screws and the said screws have nuts for clamping said heating elements.

In testimony whereof I affix my signature.

CLARENCE W. CARTER.